(12) United States Patent
Kelly et al.

(10) Patent No.: US 7,596,298 B2
(45) Date of Patent: Sep. 29, 2009

(54) SYNCHRONIZING INTERACTIVE APPLICATIONS DURING TRICK-PLAY

(75) Inventors: Declan Patrick Kelly, Eindhoven (NL); Philip Steven Newton, Eindhoven (NL); Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 729 days.

(21) Appl. No.: 10/530,378

(22) PCT Filed: Sep. 19, 2003

(86) PCT No.: PCT/IB03/04182

§ 371 (c)(1),
(2), (4) Date: Apr. 6, 2005

(87) PCT Pub. No.: WO2004/034707

PCT Pub. Date: Apr. 22, 2004

(65) Prior Publication Data

US 2005/0271353 A1    Dec. 8, 2005

(30) Foreign Application Priority Data

Oct. 10, 2002    (EP)    ................................. 02079191

(51) Int. Cl.
*H04N 5/76*    (2006.01)
(52) U.S. Cl. .......................................... 386/68; 386/46
(58) Field of Classification Search ................... 386/68, 386/95, 83, 46
See application file for complete search history.

(56) References Cited

U.S. PATENT DOCUMENTS

| 5,854,894 A | * | 12/1998 | Lancaster et al. | ........... 709/219 |
| 6,065,050 A | * | 5/2000 | DeMoney | ................... 709/219 |
| 6,621,979 B1 | * | 9/2003 | Eerenberg et al. | ............. 386/68 |
| 6,970,641 B1 | * | 11/2005 | Pierre et al. | ................... 386/83 |
| 7,000,246 B1 | * | 2/2006 | Takao | ........................ 725/141 |
| 2002/0009290 A1 | * | 1/2002 | Piesing et al. | ................. 386/85 |
| 2002/0133827 A1 | * | 9/2002 | Newnam et al. | .............. 725/89 |

FOREIGN PATENT DOCUMENTS

| EP | 1148727 A1 | 10/2001 |
| EP | 1206141 A2 | 5/2002 |
| EP | 1206141 A3 | 4/2004 |
| JP | 11-149717 | * 6/1999 |
| JP | 2001-157175 | * 6/2001 |
| WO | WO9912335 A2 | 3/1999 |
| WO | WO9912335 A3 | 3/1999 |
| WO | WO 00/00981 | 1/2000 |

* cited by examiner

*Primary Examiner*—David E Harvey

(57) ABSTRACT

A method and apparatus for the handling of a recorded data stream and associated linear application is disclosed. Linear real-time playback of the data stream and running of the linear application is commenced from a starting point thereof. On entering a non real-time playback phase, select frames from the data stream are mapped using a mapping scheme to create an interactive trick play stream. Events from the linear application are mapped into the interactive trick play stream using the disclosed mapping scheme.

17 Claims, 4 Drawing Sheets

US 7,596,298 B2

SYNCHRONIZING INTERACTIVE APPLICATIONS DURING TRICK-PLAY

The invention relates to trick play behavior of digital video data, and more particularly to a method and apparatus for controlling the operation of an application associated with the digital video data during trick play operation.

A broadcaster can broadcast multimedia platform-specific applications together with digital television programs, with a suitably equipped platform-specific set-top box receiving those applications and running them locally. Examples of such applications are electronic program guides, play-along games, tele-banking, tele-shopping, electronic newspapers and similar information services. Television programs can be recorded and, if such a television program has an application associated with it, then that application should also be recorded. Typically multimedia platform-specific applications are broadcast in a data or object carousel, where all the application code and data is broadcast in cycles. This resembles teletext data, which is also broadcast in a carousel.

A suitable transmission system for such application delivery is known from ISO/IEC International Standard 13818-6, "MPEG-2 Digital storage Media Command and Control" Jul. 12, 1996. In modern digital broadcast systems a transmitter typically transmits a large number of services (or channels) to a plurality or receivers, examples of which are to be found in television sets or set-top boxes. Such a service can contain an audio/video stream, an interactive application, for example in the MHEG-5 format, other kinds of data or a combination of these elements. An MPEG-2 transport stream is a multiplex of a number of services, and a transmitter will typically transmit several transport streams to the set-top boxes. In turn, a suitably configured set-top box can be tuned to a specific transport stream and is then able to retrieve information from that transport stream.

When running an application that is retrieved directly from a live broadcast, the "application time" increases linearly. A user cannot jump back and forth in a live broadcast. When replaying a recorded application, however, the user can select several trick play operations such as fast forward, or (fast) rewind the recording. However, it is often the case that an application that has been written for linear playback can not handle these fast forward and fast or conventional speed rewind (or more general, non-linear time) operations. Reasons for this include that an application can get events that are broadcast with the application, and the non-linear playback could result in missing such events or getting such events multiple times. An example of such an event is "layer X of football team Y has scored a goal."

When performing trick play over a digital interface, the stream is significantly transformed, e.g., only the I-frames are extracted and empty P-frames are added to cause repetition of the I-frames. In this case, only parts of the original stream are used for trick play and so only parts of the interactive applications will be present in the trick play stream. Also after trick play, the application may be in an inconsistent state which may result in problems. It will be understood that it is possible to write applications that can work well in the context of non-linear time. The problem is that not all applications can be expected to be authored such that they do work well in the context of non-linear time. Thus, there is a need for a method and apparatus for controlling the operation of the application during trick play operations so that the application is in a consistent state after the trick play operation is completed.

It is an object of the invention to overcome the above-described deficiencies by providing a method and apparatus for controlling the operation of an application during trick play operation by selectively inserting parts of the interactive content into the trick play stream to ensure that the behavior of the application is well defined. According to one embodiment of the invention, events are supplied to the application during trick play operations.

According to one embodiment of the invention, a method and apparatus for the handling of a recorded data stream and associated linear application is disclosed. Linear real-time playback of the data stream and running of the linear application is commenced from a starting point thereof. On entering a non real-time playback phase, select frames from the data stream are mapped using a mapping scheme to create an interactive trick play stream. Events from the linear application are mapped into the interactive trick play stream using the mapping scheme.

These and other aspects of the invention will be apparent from and elucidated with reference to the embodiments described hereafter.

The invention will now be described, by way of example, with reference to the accompanying drawings, wherein.

Figure 3A:
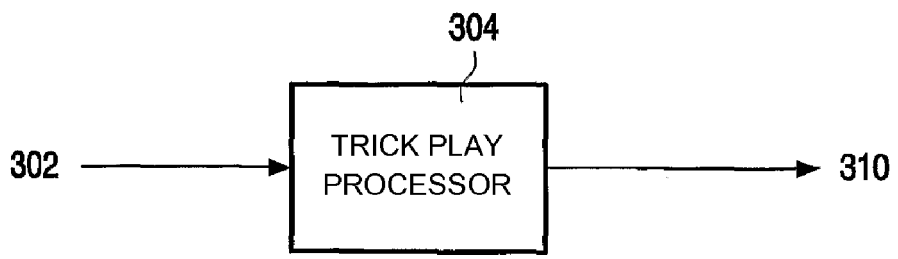
Figure 3B:
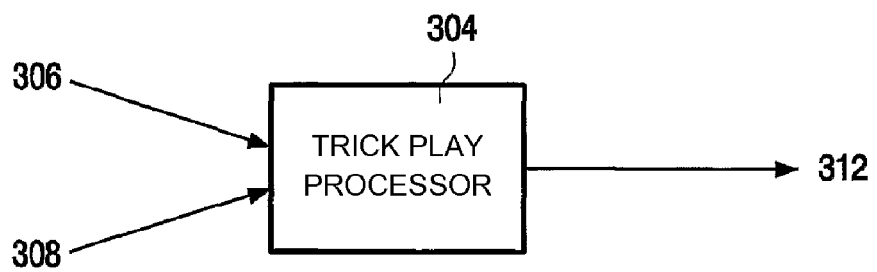
Figure 4:
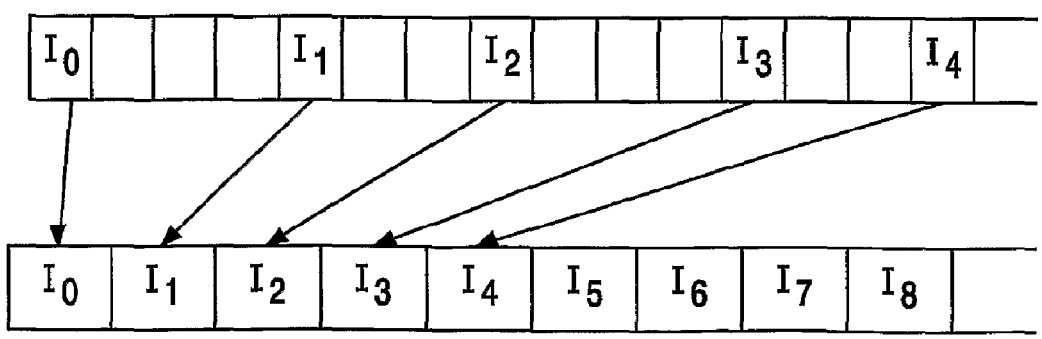
Figure 5:
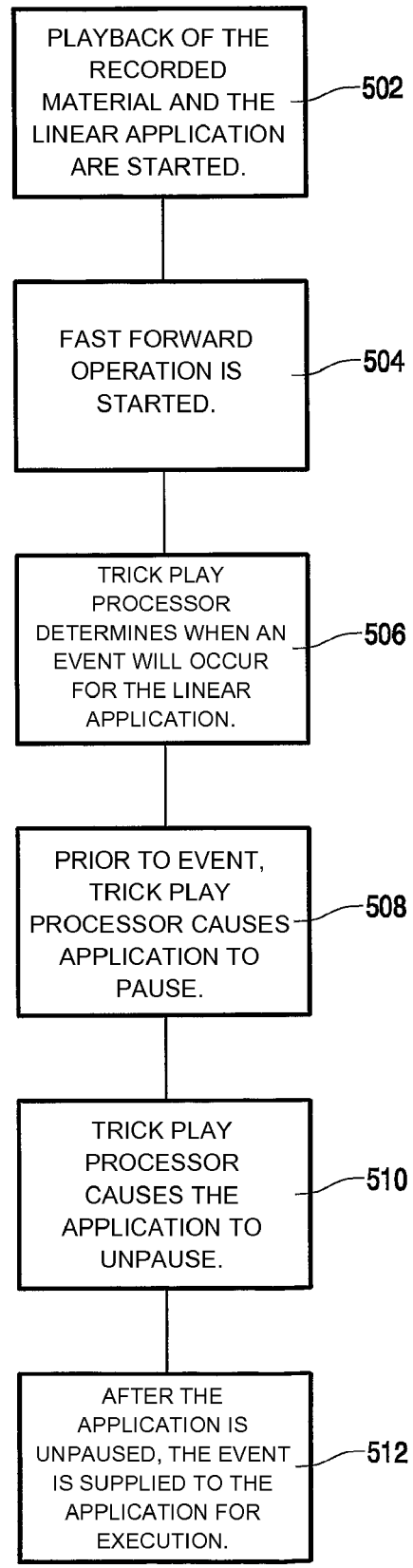

FIGS. 3(*a*)-(*b*) illustrate several trick play processing systems according to one embodiment of the invention;

FIG. 4 illustrates an original time line and a new time line for fast forward operations according to one embodiment of the invention;

FIG. 5 is a flow chart depicting the control of the operation of the interactive application during fast forward operations according to one embodiment of the invention.

Figure 1:
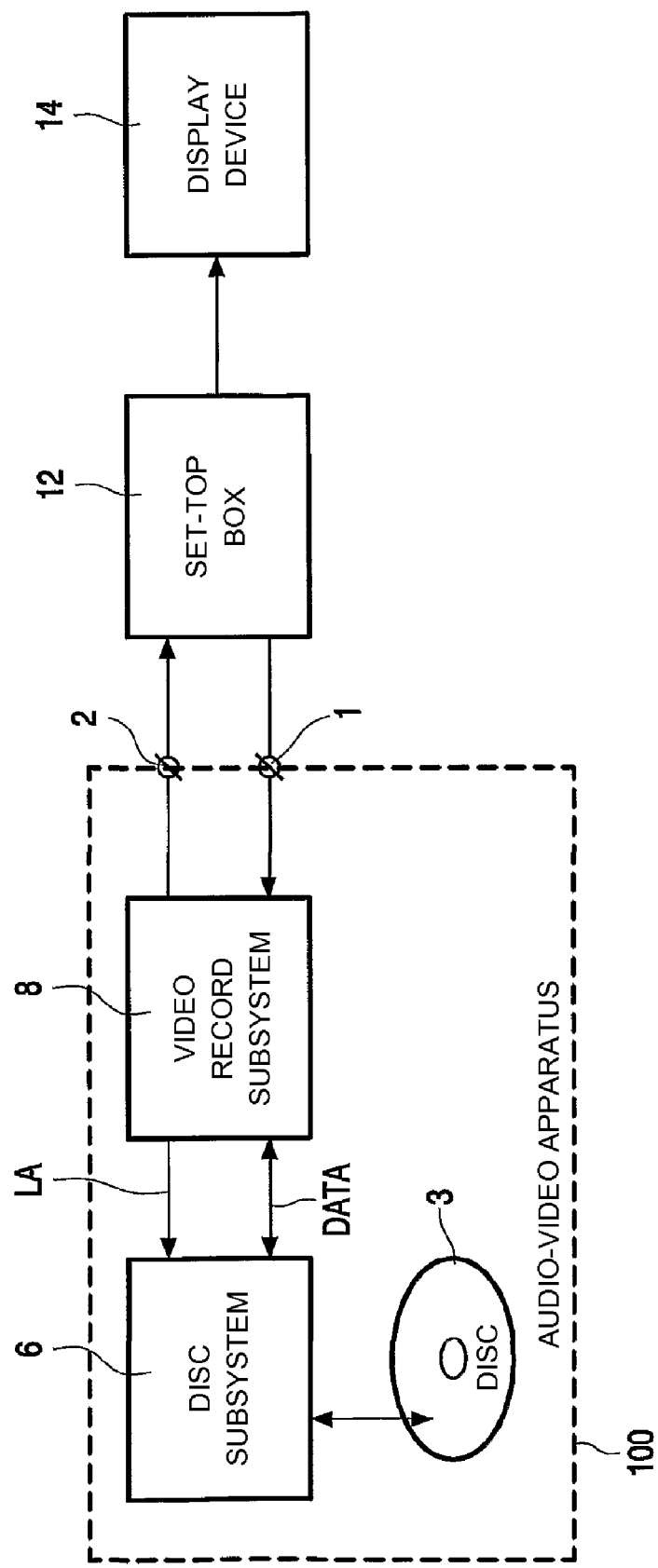
FIG. 1 illustrates a block diagram of a audio-video apparatus suitable to host embodiments of the invention.

FIG. 1 illustrates an audio-video apparatus 100 suitable to host the invention. The apparatus comprises an input terminal 1 for receiving a digital video signal to be recorded on a disc 3. Further, the apparatus comprises an output terminal 2 for supplying a digital video signal reproduced from the disc. These terminals may in use be connected via a digital interface to a digital television receiver and decoder in the form of a set-top box (STB)12, which also receives broadcast signals from satellite, cable or the like, in MPEG TS format. The set-top box 12 provides display signals to a display device 14, which may be a conventional television set.

The video recording apparatus 100 as shown in FIG. 1 is composed of two major system parts, namely the disc subsystem 6 and the video recorder subsystem 8, controlling both recording and playback. The two subsystems have a number of features, as will be readily understood, including that the disc subsystem can be addressed transparently in terms of logical addresses (LA) and can guarantee a maximum sustainable bit-rate for reading and/or writing data from/to the disc.

Suitable hardware arrangements for implementing such an apparatus are known to one skilled in the art, with one example illustrated in patent application WO-A-00/00981. The apparatus generally comprises signal processing units, a read/write unit including a read/write head configured for reading from/writing to the disc 3. Actuators position the head in a radial direction across the disc, while a motor (not shown) rotates the disc 3. A microprocessor (not shown) is present for controlling all the circuits in a known manner.

Figure 2:
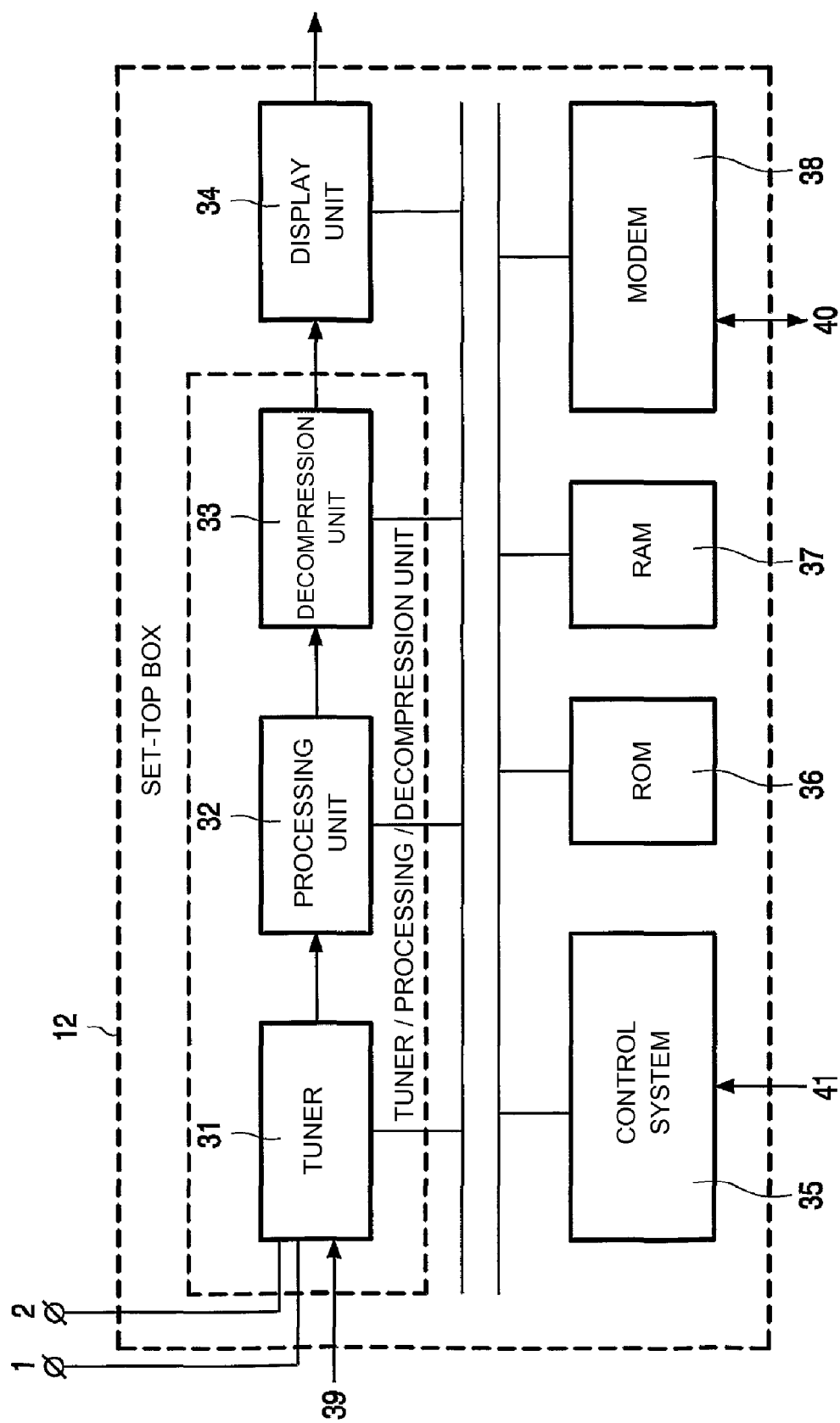
FIG. 2 illustrates a block diagram of a set-top box which can be used to implement at least one embodiment of the invention.

Referring to FIG. 2, a block diagram of the set-top box 12 is shown. It will be understood by those skilled in the art that the invention is not limited to a set top box but also extends to a variety of devices such as a DVD player, PVR box, a box containing a Hard disk (recorder module), etc. A broadcast signal 39 is received and fed into a tuner 31. The tuner 31 selects the channel on which the broadcast audio-video-interactive signal is transmitted and passes the signal to a processing unit 32. The processing unit 32 demultiplexes the packets from the broadcast signal if necessary and reconstructs the television programs and/or interactive applications embodied in the signal. The programs and applications are then decompressed by a decompression unit 33. The audio and video information associated with the television programs embodied in the signal is then conveyed to a display unit 34, which may perform further processing and conversion of the information into a suitable television format, such as NTSC or HDTV audio/video. Applications reconstructed from the broadcast signal are routed to random access memory (RAM) 37 and are executed by a control system 35.

The control system 35 may include a microprocessor, micro-controller, digital signal processor (DSP), or some other type of software instruction processing device, and may receive user input information 40. The RAM 37 may include memory units which are static (e.g. SRAM), dynamic (e.g. DRAM), volatile or non-volatile (e.g., FLASH), as required to support the functions of the set-top box. When power is applied to the set-top box, the control system 35 executes operating system code which is stored in ROM 36. The operating system code executes continuously while the set-top box is powered in the same manner as the operating system code of a typical personal computer and enables the set-top box to act on control information and execute interactive and other applications. The set-top box also includes a modem 38. The modem 38 provides both a return path by which viewer data can be transmitted to the broadcast station and an alternate path 41 by which the broadcast station can transmit data to the set-top box.

Although the term "set-top box" is used herein, it will be understood that this term refers to any receiver or processing unit for receiving and processing a transmitted signal and conveying the processed signal to a television or other monitor. The set-top box may be in a housing which physically sits on top of a television, it may be in some other location from the television, or it may be incorporated into the television itself.

According to one embodiment of the invention, parts of the interactive content are selectively supplied to the application to ensure that the behavior of the interactive application is well defined and appears consistent and predictable to the user. Two situations are to be considered. The first is where the A/V content and interactive content (iTV applications and events) are stored together in the same way as it is in the broadcast, as illustrated in FIG. 3(*a*). In this example, the A/V content and the interactive content are included in a single stream 302, which is supplied to the trick play processor 304. The trick play processor 304 outputs the trick play stream 310. The second case is where the interactive content is separated from the A/V content and stored separately, as illustrated in FIG. 3(*b*). In this example, parts of the original A/V stream are provided in stream 306 to the trick play processor 304 and the interactive content is provided to the trick play processor 304 in stream 308. The trick play processor outputs the trick play stream 312. In both cases, the trick play processing is essentially the same, however, the latter case will require much less data to be retrieved in order to generate the interactive trick play streams. It will be understood by those skilled in the art that the trick play processor 304 can be part of the control system 35 or a separate unit connected to the control system 35.

The A/V content transmitted over the digital interface should be a valid MPEG-2 transport stream in the case of trick play. Similarly, in the case of trick play with interactivity, the content transmitted must be a valid stream. To generate a valid iTV stream both applications and stream events are inserted into a MPEG-2 multiplexer.

The discussion of the invention will now be divided into several sections each dealing with a different trick play operation. For fast forward operations, the original time line is mapped onto a new time line as depicted in FIG. 4. Events that occur in the original stream must also be mapped onto the fast forward stream according to the same mapping. If the fast forward factor is n and the time trick play is started is $t(I_0)$, then event $E_x$ in the original stream that occurs at time $t(E_x)$ should be mapped to the fast forward stream at time $$t(E_x')=t(I_0)+(t(E_x)-t(I_0))/n$$

Alternatively, if $E_x$ occurs between $I_y$ and $I_{y+1}$ in the original stream then $E_x$ should again occur between $I_y$ and $I_{y+1}$ in the fast forward stream. Greater accuracy than this is not really necessary. Similarly, if the version of the application (module in MHP) changes at a particular time in the original stream, then it should be remultiplexed so that the new module is loaded at the corresponding time in the trick play stream.

One potential problem with this solution is that the set-top box may prompt the user for some input or display some information in response to an event and wait for a predetermined period of time. In the fast forward case, the next event may be received before the predetermined waiting period of the last event has expired. This might result in undefined behavior from the application. To ensure that the application is in a well defined state before each event is received, a Pause event followed by an Unpause event can be inserted into the stream before each new event. If the application is waiting for a response from the user to a previous event, the Pause/Unpause operation will cause the application to use a default response as if the user did not respond to the event within the predetermined period of time. This will ensure that the application is no longer waiting for input or is using the display when the next event occurs.

The Pause/Unpause operation can also be used in MHP (multimedia home platform). The MHP specification extends the existing DVB open standards for broadcast and interactive services in all transmission networks including satellite, cable, terrestrial and microwave systems. The MHP specification provides a consistent set of features and functions required for the enhanced broadcasting and interactive broadcasting profiles. In MHP, controlling the lifecycle of an application can be performed remotely using the AIT (Application Information Table), which allows an application control code to be specified. By changing the value of this code, the application can be started and with an extension to the standard could also be paused and unpaused prior to each event during the trick play operation.

An illustrative example of the inventive control of the operation of an application during a fast forward operation will now be described with reference to FIG. 5. First, the play back of the recorded material and the linear application are started in step 502. When the fast forward operation is started in step 504, the trick play processor 304 determines when an event will occur for the linear application in step 506. Prior to each event, the trick play processor 304 causes the application to pause and then unpause in steps 508 and 510, respectively. After the application has been unpaused, the event is supplied to the application for execution in step 512.

During fast or slow reverse, there are two possibilities. The first option is to send no iTV content to the set-top box during rewind and subsequent play until the point where the rewind started is reached. In this case anything displayed by the application will remain on the screen during the rewind but no inconsistencies will occur in the application. The second option is to pause the application when the user starts rewinding. Then when the playback reaches the point where the rewind started, the application will be unpaused. This ensures that during rewind nothing is displayed on the screen.

Slow forward is realized by including extra dummy frames in the content to cause the repetition of the original frames. In the case where iTV content is stored along with the A/V content, there is no particular action to take. The iTV applications and events are already in the stream and adding dummy frames does not change the relative positions of the iTV events and applications. When the iTV content is stored along with the A/V content, the applications and events must be inserted in the slow motion stream. There is a direct mapping between the time of the original and the time of the slowed down stream so it is straight forward to calculate where to insert the events/applications. Alternatively, they can be inserted in the stream along with the same A/V content that they would occur with in the original stream.

It will be understood that the different embodiments of the invention are not limited to the exact order of the above-described steps as the timing of some steps can be interchanged without affecting the overall operation of the invention. Furthermore, the term "comprising" does not exclude other elements or steps, the terms "a" and "an" do not exclude a plurality and a single processor or other unit may fulfill the functions of several of the units or circuits recited in the claims.

The invention may be summarized as follows:

A method and apparatus for the handling of a recorded data stream and associated linear application is disclosed. Linear real-time playback of the data stream and running of the linear application is commenced from a starting point thereof. On entering a non real-time playback phase, select frames from the data stream are mapped using a mapping scheme to create an interactive trick play stream. Events from the linear application are mapped into the interactive trick play stream using the disclosed mapping scheme.

The invention claimed is:

1. A method for handling a recorded digital audio-video data stream and associated interactive linear application in a digital audio-video playback apparatus during trick play operation, comprising:
   commencing (i) linear real-time playback of the data stream and (ii) running of the linear application from a starting point thereof with the digital audio-video playback apparatus;
   mapping, in response to entering a non real-time playback phase with the digital audio-video playback apparatus, select frames from the recorded data stream according to a mapping scheme configured to create an interactive trick play stream for use during the non real-time playback phase corresponding to the trick play operation; and
   mapping events for the linear application into the interactive trick play stream using said mapping scheme, wherein responsive to an event occurring between a first and second selected frame in the recorded data stream during linear real-time playback, the event is mapped so as to occur between the mapped first and second frames corresponding to successive frames in the interactive trick play stream during the non real-time playback phase, the method further including pausing and unpausing the linear application prior to the event during the non real-time playback phase, and executing the event of the linear application after the linear application has been unpaused.

2. The method according to claim 1, wherein the event is mapped using the following mapping scheme $$t(E_x')=t(I_0)+(t(E_x)-t(I_0))/n$$

where n is a fast forward factor, $t(I_0)$ is the time trick play is started and $E_x$ is the event.

3. The method according to claim 1, wherein any event scheduled to occur in a group-of-pictures is fed to the linear application together with a mapped I-frame during the non real-time playback.

4. The method according to claim 1, wherein the event of the linear application is executed using no user input.

5. A method for handling a recorded digital audio-video data stream and associated interactive linear application in a digital audio-video playback apparatus during trick play operation, comprising:
   commencing (i) linear real-time playback of the data stream and (ii) running of the linear application from a starting point thereof with the digital audio-video playback apparatus;
   mapping, in response to entering a non real-time playback phase with the digital audio-video playback apparatus, select frames from the recorded data stream according to a mapping scheme configured to create an interactive trick play stream for use during the non real-time playback phase corresponding to the trick play operation; and
   mapping events for the linear application into the interactive trick play stream using said mapping scheme, wherein during trick play operation the method further includes:
   determining when an event for the linear application will occur;
   pausing the linear application prior to the event;
   unpausing the linear application prior to the event; and
   executing the event of the linear application after the linear application has been unpaused.

6. The method according to claim 5, wherein the linear application is paused and unpaused using application control codes.

7. An apparatus for handling a recorded data stream and associated linear application during trick play operation, comprising:
   means for commencing (i) linear real-time playback of the data stream and (ii) running of the linear application from a starting point thereof;
   means, responsive to entering a non real-time playback phase, for mapping select frames from the recorded data stream according to a mapping scheme configured to create an interactive trick play stream for use during the non real-time playback phase corresponding to the trick play operation; and
   means for mapping events for the linear application into the interactive trick play stream using said mapping scheme, wherein responsive to an event occurring between a first and second selected frame in the recorded data stream during linear real-time playback, the event is mapped so as to occur between the mapped first and second frames corresponding to successive frames in the interactive trick play stream during the non real-time playback phase, the apparatus further including:
   means for pausing and unpausing the linear application prior to the event during the non real-time playback phase, and means for executing the event of the linear application after the linear application has been unpaused.

8. The apparatus according to claim 7, wherein the event is mapped using the following mapping scheme $$t(E_x')=t(I_0)+(t(E_x)-t(I_0))/n$$

where n is a fast forward factor, $t(I_0)$ is the time trick play is started and $E_x$ is the event.

9. The apparatus according to claim 7, wherein any event scheduled to occur in a group-of-pictures is fed to the linear application together with a mapped I-frame during the non real-time playback.

10. The apparatus according to claim 7, wherein the event of the linear application is executed using no user input.

11. An apparatus for handling a recorded data stream and associated linear application during trick play operation, comprising:
  means for commencing (i) linear real-time playback of the data stream and (ii) running of the linear application from a starting point thereof;
  means, responsive to entering a non real-time playback phase, for mapping select frames from the recorded data stream according to a mapping scheme configured to create an interactive trick play stream for use during the non real-time playback phase corresponding to the trick play operation; and
  means for mapping events for the linear application into the interactive trick play stream using said mapping scheme, further comprising:
  means for determining on entering a non linear playback phase when an event for the linear application will occur;
  means for pausing the linear application prior to the event;
  means for unpausing the linear application prior to the event; and
  means for executing the event of the linear application after the linear application has been unpaused.

12. The apparatus according to claim 11, wherein the linear application is paused and unpaused using application control codes.

13. A method for handling a recorded digital audio-video data stream and associated interactive linear application in a digital audio-video playback apparatus during trick play operation, comprising:
  commencing (i) linear real-time playback of the data stream and (ii) running of the linear application from a starting point thereof with the digital audio-video playback apparatus;
  mapping, in response to entering a non real-time playback phase with the digital audio-video playback apparatus, select frames from the recorded data stream according to a mapping scheme configured to create an interactive trick play stream for use during the non real-time playback phase corresponding to the trick play operation;

mapping events for the linear application into the interactive trick play stream using said mapping scheme, wherein responsive to an event occurring between a first and second selected frame in the recorded data stream during linear real-time playback, the event is mapped so as to occur between the mapped first and second frames corresponding to successive frames in the interactive trick play stream during the non real-time playback phase; and
  pausing and unpausing the linear application prior to the event during the non real-time playback phase using application control codes, and executing the event of the linear application after the linear application has been unpaused.

14. An apparatus comprising:
  a playback system configured to commence (i) linear real-time playback of a recorded data stream and (ii) running of an associated linear application from a starting point thereof; and
  a mapper configured to map, in response to the playback system entering a non real-time playback phase corresponding to a trick play operation, select frames from the recorded data stream according to a mapping scheme to create an interactive trick play stream for use during the non real-time playback phase,
  the mapper further configured to map events for the linear application into the interactive trick play stream using the mapping scheme, wherein responsive to an event occurring between a first and second frame in the recorded data stream during linear real-time playback, the event is mapped so as to occur between the mapped first and second successive frames in the interactive trick play stream during the non real-time playback phase, wherein responsive to entering the non real-time playback phase, the playback system is further configured to (a) determine when an event for the linear application will occur, (b) pause the linear application prior to the event, (c) unpause the linear application prior to the event, and (d) execute the event of the linear application after the linear application has been unpaused.

15. The apparatus of claim 14, wherein the event is mapped using a mapping scheme that includes determining $$t(E_x')=t(I_0)+(t(E_x)-t(I_0))/n, \text{ where:}$$

n is a fast forward factor, $t(I_0)$ is the time trick play is started and $E_x$ is the event.

16. The apparatus of claim 14, wherein any event scheduled to occur in a group-of-pictures is fed to the linear application together with a mapped I-frame during the non real-time playback.

17. The apparatus according to claim 14, wherein the event of the linear application is executed using no user input.

* * * * *